Figure 1:
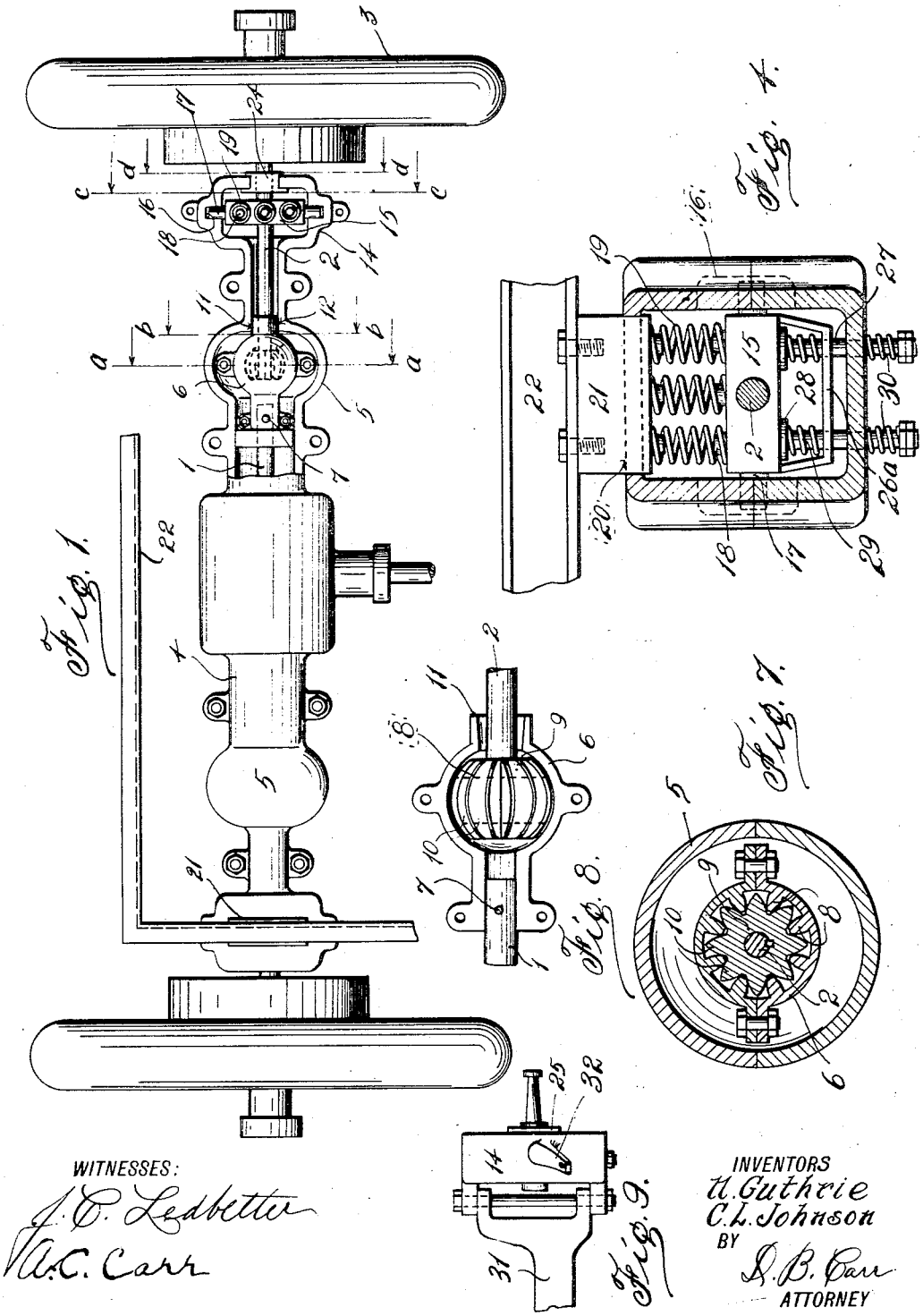

N. GUTHRIE & C. L. JOHNSON.
RESILIENT MEANS FOR VEHICLE AXLE SUSPENSION.
APPLICATION FILED DEC. 1, 1913.
1,143,699.
Patented June 22, 1915.
2 SHEETS—SHEET 2.
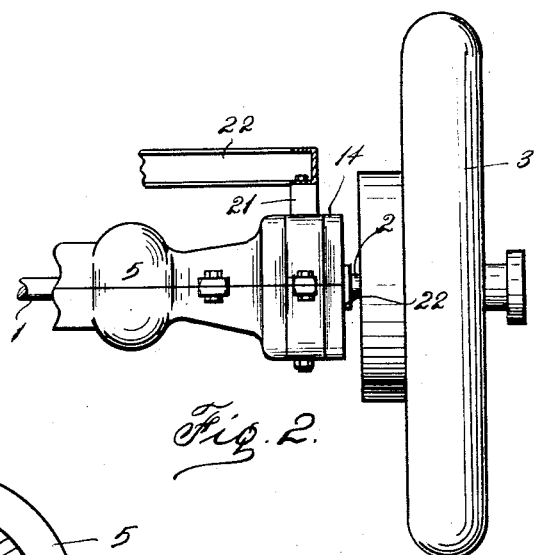
Fig. 2.
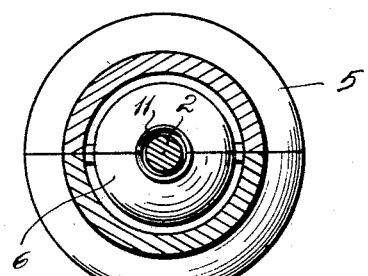
Fig. 6.
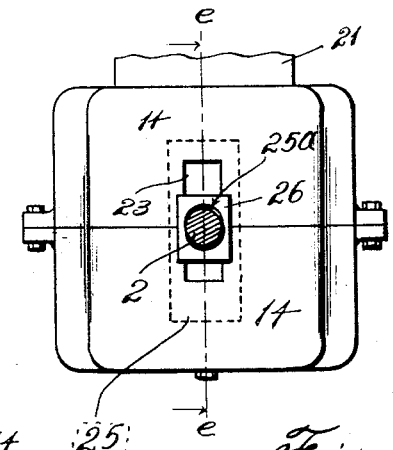
Fig. 5.
Fig. 3.
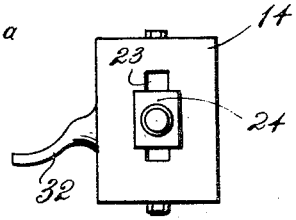
Fig. 10.
WITNESSES:
J. C. Ledbetter
A. C. Carr
INVENTORS
N. Guthrie
C. L. Johnson
BY
D. B. Carr
ATTORNEY

UNITED STATES PATENT OFFICE.

NEHEMIAH GUTHRIE, OF MARIETTA, OKLAHOMA, AND CALLENDER L. JOHNSON, OF DALLAS, TEXAS.

RESILIENT MEANS FOR VEHICLE AXLE SUSPENSION.

1,143,699.    Specification of Letters Patent.    Patented June 22, 1915.

Application filed December 1, 1913. Serial No. 804,131.

*To all whom it may concern:*

Be it known that we, NEHEMIAH GUTHRIE and CALLENDER L. JOHNSON, citizens of the United States of America, residing at Marietta, Love county, Oklahoma, and Dallas, Dallas county, Texas, respectively, have invented certain new and useful Improvements in Resilient Means for Vehicle Axle Suspension, of which the following is a specification, Our invention relates to new and useful resilient means for vehicle axle suspension, and is particularly adapted for use on motor vehicles.

The invention embodies means of resilient suspension for the live axle or rear wheels, and the front spindles of an automobile or other vehicle.

Primarily, the object of the invention is to provide the live axle of a car with a limited universal joint and suspend the free ends of said axle between resilient members; the said free ends being adapted to carry the transport or ground wheels.

Another purpose of the invention resides in provision of similar suspension for the front spindles of cars, and likewise adapts the invention to use on heavy motor trucks.

Finally the object of the invention is to provide a device of the character described that will be strong, durable and efficient, simple and comparatively inexpensive to construct and the various parts of which will not be likely to get out of working order.

With the above and other objects in view, the invention has relation to novel features of construction and operation, an example of which is described in this specification and illustrated in the accompanying drawings, wherein:

Figure 1 is a plan view of the rear axle of an automobile, showing a portion of the axle housing removed. Fig. 2 is a front or rear elevation of a portion of the rear axle. Fig. 3 is a view upon the line *d—d* of Fig. 1. Fig. 4 is a sectional view of a portion of the axle housing, the section being taken upon the line *c—c* of Fig. 1. Fig. 5 is a sectional view of a portion of said axle housing, the section being taken transverse to that of Fig. 3; the said section being taken upon the line *e—e* of Fig. 3. Fig. 6 is a view taken upon the section line *b—b* of Fig. 1. Fig. 7 is a sectional interior view of the casing illustrated in Fig. 6, said section being taken on the line *a—a* of Fig. 1. Fig. 8 is a plan view of a universal joint which is embodied in my invention, a part of the casing of same being removed. Fig. 9 is a front elevation of the front wheel spindle carried within the steering knuckle of the front axle. Fig. 10 is a view in side elevation of the parts illustrated in Fig. 9.

Referring now more particularly to the drawings, wherein similar parts are designated by similar reference characters throughout the drawings, the numerals 1 and 2 denote the live axle of a motor vehicle, the ground wheel 3 being carried by the portion 2 of said axle.

As in present day practice, the rear axle is carried and journaled in the housing 4. This housing carries the floating rear axle and adapts the body of the car to an easy and resilient suspension, reducing road and driving vibration to a minimum. It will here be understood that the portion 2 of the live axle which carries the road wheel will be subjected to a vibrating movement in a vertical plane. Fig. 2 illustrates an axle housing which will allow this vertical movement.

A portion of the axle housing, as indicated by the numeral 5, is formed into a spherical shell. This shell portion accommodates a universal-joint 6, which, is embodied in the axle. The universal-joint revolves in the casing or shell 5. The shell portion 6 of said universal-joint is formed of two halves rigidly bolted together and clamped upon the extremity of the axle 1. A pin 7 further fixes the member 6 to the axle 1. The interior of the member 6, as best shown in Fig. 7, carries a plurality of teeth 8. The teeth 8 are arcuate in form and engage a member 9 which is contained in the shell formed by the two members 6. The member 9 has teeth 10 formed upon its periphery and adapted to engage the teeth 8 of the member 6. The teeth 10 are similarly arcuate in form and correspond in contour to that of the teeth 8. The member 9 is keyed and rigidly fixed to the axle 2.

A neck 11 is integral with the member 6, as best shown in Fig. 1. The exterior periphery of the neck 11 lies in contact with the axle housing and forms a bearing, as indicated by the numeral 12, for the outer extremity of the member 6. As shown in Fig. 8, the interior periphery of the neck 11 does not contact the axle 2, but is spaced slightly apart therefrom, which allows the axle 2 a slight movement in a vertical plane as will later be seen.

It is seen that the universal joint 6 is adapted to revolve with the axle 1 and transmit the power of said axle to the axle 2.

As will later be seen, the member 9 of the universal joint is subjected to a very slight movement out of its straight line drive. There should be just enough looseness in the meshing of the teeth 9 and 10 to compensate for the difference in change of the pitch necessarily encountered in this type of universal joint, when the said joint is subjected to its slight changes in line drive.

The axle housing is seen enlarged and formed into an elongated form of casing member as indicated by the numeral 14. The axle 2 is journaled in a bearing block 15 contained in the housing 14. The opposite end walls of said housing have vertical grooves or slots 16 formed in their interior faces. The bearing block 15 has formed on its opposite sides and adjacent to the slots 16, integral guide pins 17, said pins being adapted to a slidable up and down movement in the grooves 16. Upon the top face of the bearing block 15 are formed integral lugs 18, said lugs being adapted to retain a number of coiled springs or similar resilient members 19.

The upper face of the housing 14 has formed therein a large aperture 20 of rectangular shape. This aperture forms a guideway for and receives the bed block 21. The bed block 21 receives and substantially carries the usual channeled frame 22 upon which is carried the body of the car.

The housing 14 has formed in its outer side wall an elongated slot or aperture 23, as best shown in Fig. 3. The axle 2 carries a float bearing 24 which is mounted in this slot and adapted to reciprocate therein. The member 24 has an integral plate 25 of rectangular shape, which is adapted to lie in close contact with the interior wall of the casing and close the aperture 23. An exterior flanged portion 26 adapts the member 24 to be guided within the aperture 23. The function of the member 24 and integral plate 25 is to close the opening 23 against dust occasioned and encountered from use on the road.

It is seen how the float bearing 24, carried by the axle 2 and retained in the slot 23, is subjected to a vertical movement through the said slot as the axle vibrates under its load and road irregularities. In road vibration the axle 2 will have the universal joint as a center and tend to describe an arc at its outer end. This arc is limited by the aperture 23 in the housing 14; it is therefore seen that the movement of the outer end of the axle 2, about an arc, is very slight. Provision, however, is made in the member 24 to prevent the axle binding and straining said member.

The interior periphery of the aperture 70 in the member 24 is not cylindrical in form but is modified to accommodate the slight pivotal or rocking movement of the axle in said aperture, incident to said axle's vertical movement about the universal joint as a center. The numeral 25ª indicates the axially flared aperture above referred to, as best shown in Figs. 3 and 5. The bearing block 15, having a resilient and flexible suspension, is not provided with such an aperture as is carried by the member 24.

The bearing block 15, reference being had to Fig. 4, carries on its lower portions an integral hanger bracket 26ª. A pair of bolts 27 is carried in the lower wall of the housing 14 and extend through the bracket 26ª where the heads 28 of said bolts normally lie in contact with the under face of the bearing block 15. Coil springs 29 are carried by the bolts and confined between the bracket 26ª and heads of said bolts. Similar resilient members 30 are confined on the lower extremity of the bolts 27. The purpose of the hanger bracket is, upon the upward movement of the axle, to bring the resilient members confined on the bolts 27 into action and thereby assist in carrying the load sustained by the axle.

The foregoing description of the assembly of elements contained in the housing 14, establishing a resilient and flexible suspension of the axle and ground wheel whereby the road and motor vibration are absorbed directly through the resilient axle rather than distributed through the axle housing and thence through the elliptical springs to the vehicle body as is the case with the present methods.

As the pressure is upward on the axle 2, the upper springs will support practically all the load; hence their greater number and size as compared to the lower spring members.

In some cases it will be found preferable to eliminate the last mentioned springs 30. In such case the housing 14 will have the appearance as illustrated in the several views exclusive of Fig. 4, said figure, in fact, being only a modified form of the invention.

The application of the principle herein embodied and claimed is extended to the front wheels and axles of a vehicle. Figs. 9 and 10 illustrate such application. The usual steering knuckles of a front axle 31 are removed and the housing 14 substituted. In this case the usual steering arm would be integral with the housing 14, as indicated by the numeral 32. This would adapt the front axles, without the use of a universal joint, to be resiliently suspended.

The invention is presented as including all such modifications and changes as properly come within the scope of the following claims:

What I claim is:

1. In an axle, an axle mounted in a housing, a universal joint carried on the axle, the axle housing enlarged to form a casing, a bearing block carried on the axle, guide members formed on the bearing block, means for guiding the bearing block through a vertical displacement, resilient members cooperating with the bearing block and adapted to carry a bed block which supports the vehicle body.

2. In an axle, the combination with an axle mounted in a housing, a universal joint carried on the axle, an axle housing, a bearing block, guide members carried by the bearing block, means for guiding the bearing block through a vertical displacement, resilient members cooperating with the bearing block, a hanger bracket cooperating with the resilient members, an opening in the top of the casing, a bed block disposed in the opening, an aperture or opening in the side of the casing adapted to accommodate the vertical displacement of the axle, and means for closing said opening.

3. In an axle, the combination of axle mounted in a housing, the axle housing enlarged to form a casing, a bearing block carried on the axle, guide members formed on the bearing block, guide ways formed in the casing and adapted to receive the guide members, a nest of resilient coiled members carried upon the bearing block, a bed block, bolts carried by the wall of the casing, coiled resilient members confined on the bolts, a hanger bracket carried by the bearing block and adapted to cooperate with the resilient members confined on the bolts, an opening in the casing adapted to accommodate the movements of the axle, and a float bearing adapted to slide in and cover said opening.

4. In an axle, a universal joint carried on an axle, a bearing block carried by the axle, guide members formed on the bearing block, an axle housing, guide ways formed in the housing and receiving the bearing block, a bed block, coiled resilient members interposed between the bearing block and bed block, a hanger bracket correlated with the bearing block and means provided for resiliently suspending the hanger bracket.

In testimony whereof, we affix our signatures in the presence of two witnesses.

NEHEMIAH GUTHRIE.

Witnesses:
 FRANCES WENDT,
 CLOTILDE BUCHANAN.

CALLENDER L. JOHNSON.

Witnesses:
 W. G. CRAWFORD,
 J. C. LEDBETTER.